United States Patent [19]

Ueda

[11] Patent Number: 5,004,899

[45] Date of Patent: * Apr. 2, 1991

[54] SEMICONDUCTOR CARD WHICH CAN BE FOLDED

[75] Inventor: Tetsuya Ueda, Itami, Japan

[73] Assignee: Mitsubishi Denki Kabushiki Kaisha, Tokyo, Japan

[*] Notice: The portion of the term of this patent subsequent to Jul. 18, 2006 has been disclaimed.

[21] Appl. No.: 337,875

[22] Filed: Apr. 14, 1989

Related U.S. Application Data

[62] Division of Ser. No. 26,967, Mar. 17, 1987, Pat. No. 4,849,617.

[30] Foreign Application Priority Data

Mar. 17, 1986 [JP] Japan ................................. 61-60250

[51] Int. Cl.$^5$ ............................................. G06K 19/06
[52] U.S. Cl. .................................... 235/492; 235/487
[58] Field of Search ................. 235/492, 487; 364/708

[56] References Cited

U.S. PATENT DOCUMENTS

| 4,264,962 | 4/1981 | Kodaira | 364/707 |
| 4,639,585 | 1/1987 | Haghiri-Tehrani et al. | 235/492 |
| 4,677,528 | 6/1987 | Miniet | 235/492 X |
| 4,849,617 | 7/1989 | Ueda | 235/492 |

FOREIGN PATENT DOCUMENTS 59-174982 10/1984 Japan .

Primary Examiner—David Trafton
Attorney, Agent, or Firm—Sterne, Kessler, Goldstein & Fox

[57] ABSTRACT

A thin semiconductor card, such as an IC card, includes a card main body, and a semiconductor module mounted therein. A foldable part or member is provided permitting the card main body to be folded.

5 Claims, 4 Drawing Sheets

SEMICONDUCTOR CARD WHICH CAN BE FOLDED

This application is a division, of application Ser. No. 07/026,967, filed Mar. 17, 1987 now U.S. Pat. No. 4,849,617.

BACKGROUND OF THE INVENTION

The present invention relates to thin semiconductor cards incorporating semiconductor devices, such as IC cards, and specifically to the structure of the card.

Such cards have a variety of configurations. The configuration discussed below is that of a prior art IC card with built-in semiconductor module.

Plan and side views of such an IC card are shown in FIG. 4 at (a) and (b). The components are the semiconductor module 1 and the card main body 2. Electrical communication with external devices is performed through a number of electrode contacts 7 mounted on the surface of the semiconductor module.

When information is written into or read from such an IC card, the card must be inserted into an external device, which communicates with the card main body through the electrode contacts 7.

The dimensions and external configuration of the most widely-used IC cards have been standardized. When such cards are attached to clothing etc. for use as personal indentification (ID cards), their large size is an inconvenience, and exposure of the contact surfaces may cause destruction of internal circuit elements because of the static charges.

SUMMARY OF THE INVENTION

An object of the present invention is to provide a thin semiconductor card that is convenient to carry and that affords protection from static destruction.

According to the invention, deformable hinging means are provided so that the card can be folded. Folding the card simplifies carrying, and in the folded position the contacts cannot be touched by people and objects bearing static charges, so the internal semiconductor components are protected from static destruction.

BRIEF DESCRIPTION OF THE DRAWINGS

In the accompanying drawings:

FIG. 1 (c) is an enlarged sectional view of the deformable part of the semiconductor card as unfolded;

FIG. 2 (b) is a perspective view showing the thin semiconductor card of FIG. 1 as folded;

FIG. 2 (c) is an enlarged sectional view of the deformable part of the semiconductor card as folded;

FIG. 3 (b) is a side view showing the thin semiconductor card of FIG. 3 (a) as folded;

FIG. 3 (c) is an enlarged view showing the deformable portion of the thin semiconductor card of FIG. 3 (a) and FIGS. 4 (a) and 4 (b) are a plan view and a side view showing a conventional thin semiconductor card.

DETAILED DESCRIPTION OF THE PREFERRED EMBODIMENTS

Figure 1A:
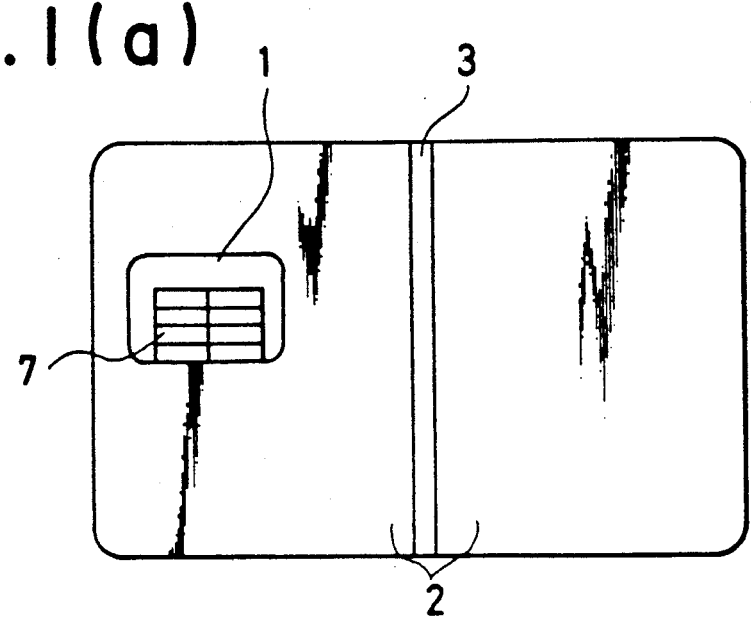
FIGS. 1 (a) and 1 (b) are a plan view and a side view showing a thin semiconductor card of an embodiment of the invention.
Figure 1B:
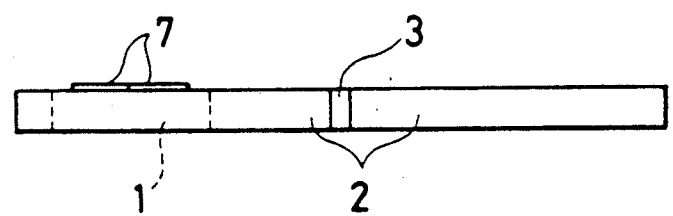
Figure 1C:
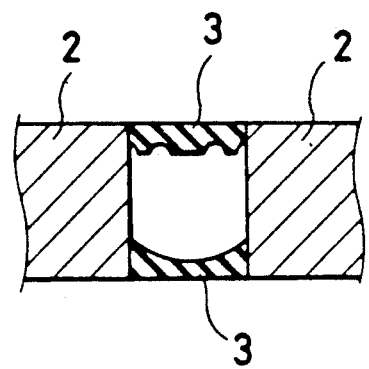

The embodiment of the present invention are described below with reference to the drawings. The IC card embodying the invention depicted in FIG. 1 comprises a card main body 2 and a semiconductor module 1. The card main body 2 is divided into two sections connected by the deformable hinging part 3. As shown in FIG. 1 (c), the deformable hinging part comprises expandable polymer rubber bridges linking the two sections of the card. In the unfolded position shown in FIG. 1, the card conforms to international standards regarding card dimensions.

When the above-described IC card is used with an external read/write device, it is unfolded as in FIG. 1 so that it assumes the standard dimensions. It can then be inserted in the external device for exchange of information.

Figure 2A:
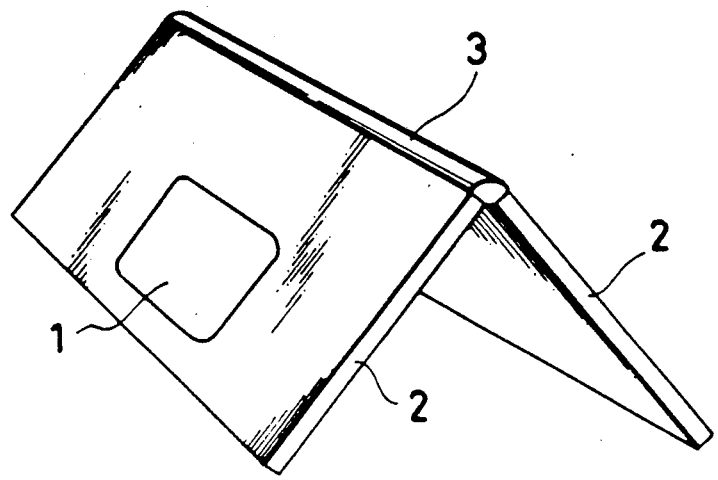
FIG. 2 (a) is a perspective view showing the thin semiconductor card of FIG. 1 in the process of being folded.
Figure 2B:
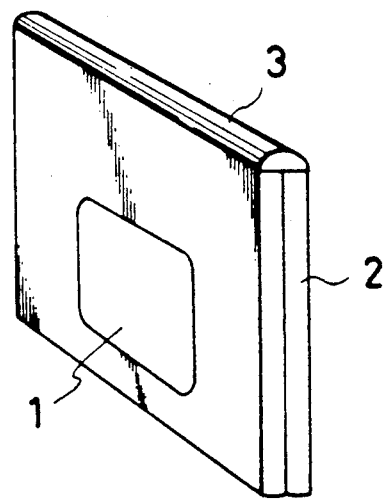
Figure 2C:
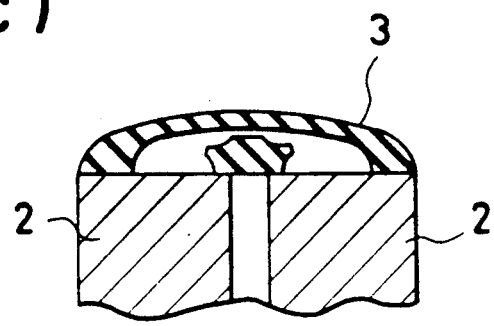

When the card is carried, it is folded at the deformable hinging parts as shown in FIG. 2 (a) and carried in the closed state depicted in FIG. 2 (b). The detailed view in FIG. 2 (c) shows the configuration of the deformable hinging part in the closed state.

When folded shut, the card of this embodiment is convenient to carry, yet it can be used with no hindrance with existing external devices because it unfolds to the standard dimensions. In the folded state, the contacts 7 are on the inside, where they cannot be touched by people and objects bearing static charges. The internal semiconductor circuits are thereby protected from static destruction.

The ability of the card to fold in a particular direction increases its capability to withstand external forces applied in that direction, thereby improving the reliability of the card in comparison with the prior art card.

The invention is not limited to the IC card of the embodiment described above but can be applied to any thin semiconductor card, and the size of card is not limited to the international standard for IC cards.

The configuration and materials of the deformable hinging part are not limited to the polymer rubber mentioned in the above embodiment, nor are there restrictions on the placement of or number of deformable hinging parts. The card may have two or more hinging parts so that the card is folded into three, four or a larger number.

Figure 3A:
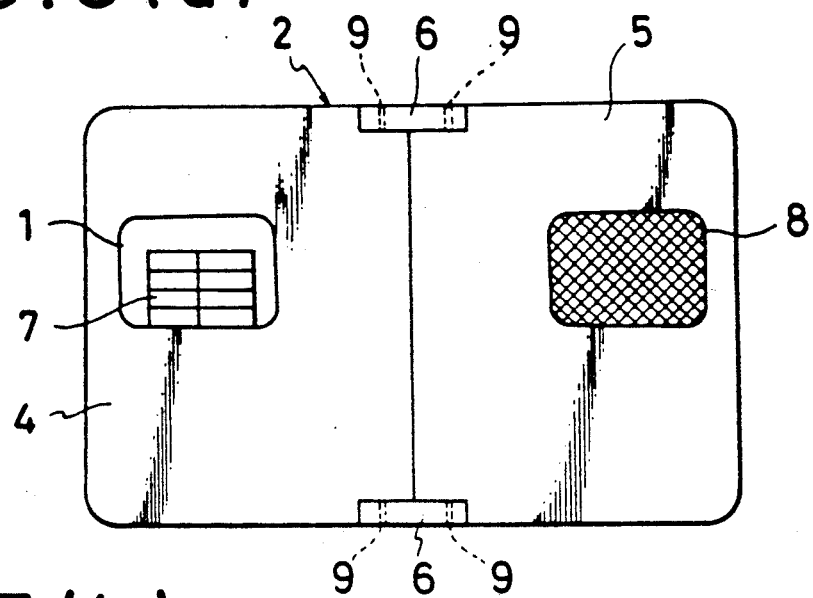
FIG. 3 (a) is a plan view showing a thin semiconductor card of another embodiment.
Figure 3B:
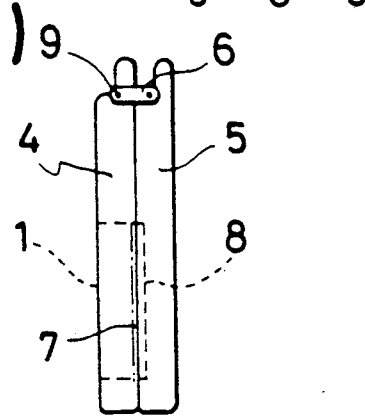
Figure 3C:
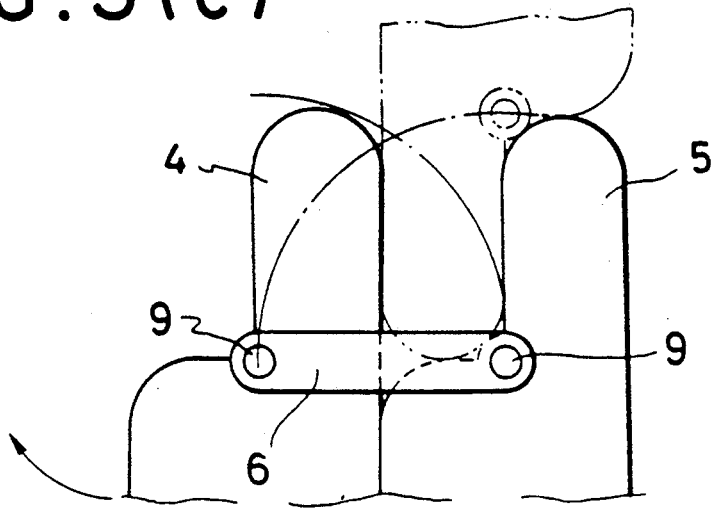
Figure 4A:
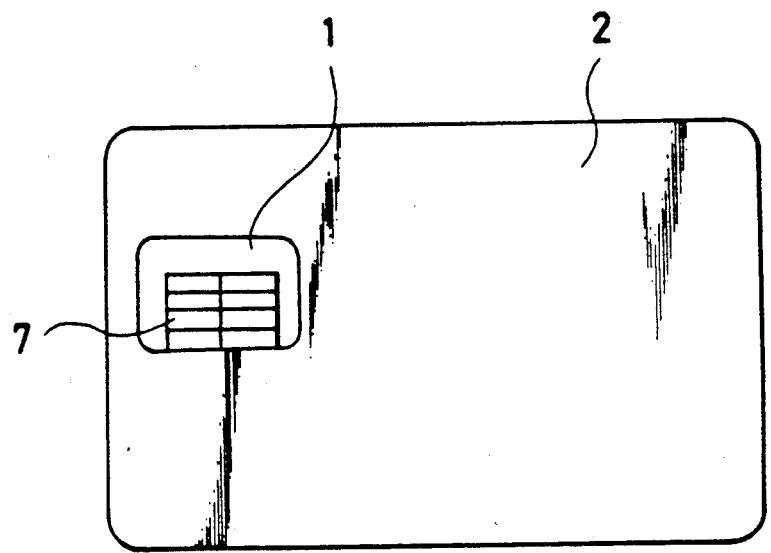
Figure 4B:
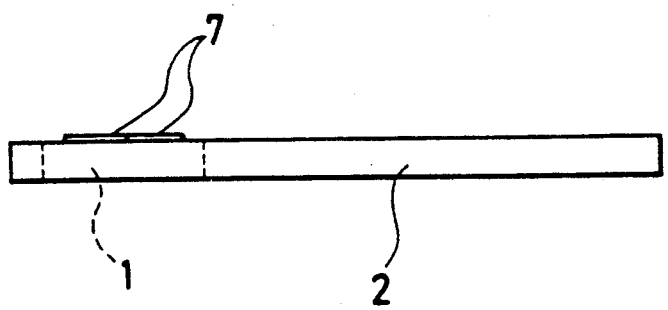

FIG. 3 shows another embodiment of the invention. In contrast to the embodiment of FIG. 1, in which a deformable part is provided in a part of the card main body, the card of the embodiment of FIG. 3 has a structure comprising two separate halves. In all, the card main body 2 comprises three parts: a first half 4 containing a semiconductor module 1, a second half 5 not containing such a module, and linkage member 6 between the two halves 4 and 5. The halves 4 and 5 can be made from, for example, a poly-vinyl chloride (PVC). The two halves rotate around pins 9.

This card can be used in the same way as described above with reference to the embodiment of FIG. 1; that is, opened for use as in FIG. 3 (a) and closed for carrying as in FIG. 3 (b). FIG. 3 (c) shows a detailed view of the vicinity of the linkage member 6. The solid lines show the folded configuration, and the phantom lines represent the card in the opened position.

The embodiment shown in FIG. 3 is also provided with a measure for preventing so-called "soft errors" resulting from static charges. The half 5 not containing the semiconductor module is provided, at a certain part thereof, with a conductive coating 8 consisting, for example of a conductive plastic. The conductive coating 8 is located so as to touch all of the electrode contacts 7 when the card is closed for carrying, thereby bringing all contacts to the same electrical potential.

This embodiment of the present invention has an additional advantages in that it has a higher reliability due to enhanced protection against static destruction.

The linkage member 6 depicted in FIG. 3 are shown as an example, not implying any limitation regarding the materials or configuration of the linkage. The substance of the conductive coating is similarly not limited, nor is the method of equalizing the potential of the contacts restricted to that used in this embodiment. For example, in place of the conductive coating a separate conductive material may be mounted or bonded on the card.

In summary, a thin semiconductor card embodying this invention has a foldable structure that is convenient for carrying and affords protection against damage to the internal semiconductor components, in that the electrode contacts are concealed inside when the card is folded. In addition, this invention enables further improvement in reliability to be attained by means of a conductive substance provided on the card in such a location as to touch the electrode contact surfaces. A further advantage of this folding card structure is the protection it offers against damage resulting from mechanical force applied in the folding direction.

What is claimed is:

1. An integrated circuit card for electronically exchanging information with an external device, which integrated circuit card comprises:
    a thin circuit card main body, said thin circuit card main body comprising a first portion and a second portion;
    a semiconductor module mounted in said first portion of said circuit card main body, said semiconductor module containing data to be read by the external device; and
    folding means permitting said first portion be folded substantially shut with respect to said second portion to thereby facilitate storage of said integrated circuit card for the user.

2. An integrated circuit card according to claim 1, wherein said folding means is formed of part of said circuit card main body.

3. An integrated circuit card according to claim 2, wherein said circuit card main body can be folded in substantially one direction.

4. An integrated circuit card according to claim 1 wherein said folding means comprises a separate linkage means linking said first and second portions together.

5. An integrated circuit card according to claim 4, wherein said circuit card main body can be folded in substantially one direction.

* * * * *